United States Patent [19]

Ohta et al.

[11] Patent Number: 5,673,359

[45] Date of Patent: Sep. 30, 1997

[54] RECORDING DISK AND RECORDED INFORMATION REPRODUCING APPARATUS

[75] Inventors: Minemasa Ohta; Naoto Itoh, both of Yamanashi, Japan

[73] Assignees: Pioneer Video Corporation, Yamanashi; Pioneer Electronic Corporation, Tokyo, both of Japan

[21] Appl. No.: 501,463

[22] Filed: Jul. 12, 1995

[30] Foreign Application Priority Data

Jul. 29, 1994 [JP] Japan ................... 6-178637

[51] Int. Cl.⁶ ....................... H04N 5/781; H04N 5/91
[52] U.S. Cl. ............................. 386/125; 386/80
[58] Field of Search ..................... 358/342, 335, 358/310, 320, 321, 343, 322, 327, 341; 369/44.26, 54, 48, 58; 748/384; 360/32, 33.1, 48; 386/80, 78, 79, 82, 125, 126, 45, 46; H04N 5/781, 5/91

[56] References Cited

U.S. PATENT DOCUMENTS

| | | | |
|---|---|---|---|
| 5,239,382 | 8/1993 | Hatakenaka et al. | 386/125 |
| 5,351,132 | 9/1994 | Sawabe et al. | 358/342 |
| 5,552,896 | 9/1996 | Yoshida | 386/125 |

*Primary Examiner*—Robert Chevalier
*Attorney, Agent, or Firm*—Morgan, Lewis and Bockius, LLP

[57] ABSTRACT

A recording disk carrying a compressed video signal at a high recording density and a recorded information reproducing apparatus for reproducing the information recorded on the particular recording disk. A linear velocity of the reading of information is adjusted according to a data quantity signal reproduced from the recording disk having data areas in which a compressed video signal produced by the compression and coding process is recorded in predetermined unit blocks (GOP block) and at least a data quantity information recording area in which a data quantity signal representing the quantity of each unit of the compressed video signal is recorded.

3 Claims, 6 Drawing Sheets

RECORDING DISK AND RECORDED INFORMATION REPRODUCING APPARATUS

BACKGROUND OF THE INVENTION

1. Field of the Invention

The present invention relates to a recording disk on which a compressed video signal produced by performing a compression processing to a video signal, and a recorded information reproducing apparatus for reading the compressed video signal from the recording disk and for obtaining a reproduction video signal by decoding (expanding) the read-out compressed video signal.

2. Description of Background Information

Figure 1:
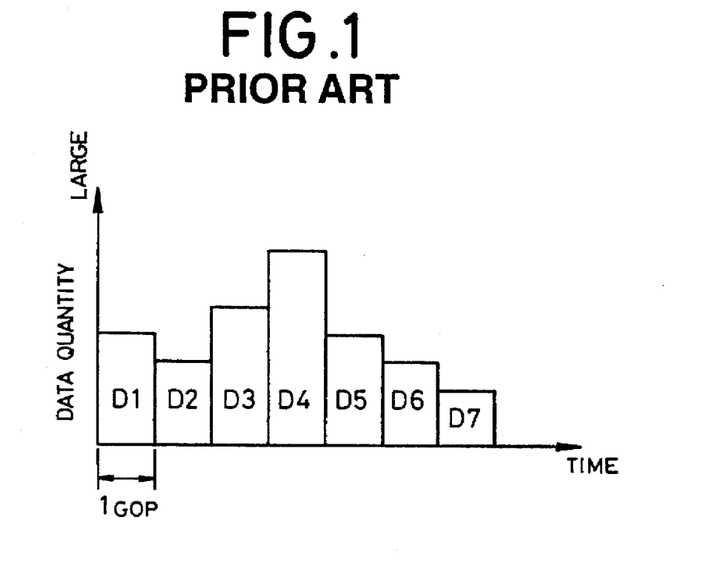
FIG. 1 is a diagram showing an example of the compressed video signal in each one GOP, produced by the compression and coding process of a video signal.

FIG. 1 is a diagram showing, in a comparison fashion, data quantity of a compressed video signal produced by compressing and coding a video signal by means of MPEG (Motion Picture coding Expert Group) system which conforms to ISO 11172. In FIG. 1, GOP (Group of Picture) represents a unit of processing in the compressing and coding procedure. As one example, 1 GOP corresponds to an image reproduction period of 0.5 second.

In FIG. 1, data quantity of the compressed video signal in the GOP block 4 corresponding to a pattern of images which includes an abundance of motions and of high complexity becomes larger than that of the compressed video signal in the GOP block 7 corresponding to an image pattern which is relatively motionless and of less complexity. In short, the data quantity of each of the compressed video signal obtained by the compressing and coding process differs depending on the contents of the image.

Figure 2:
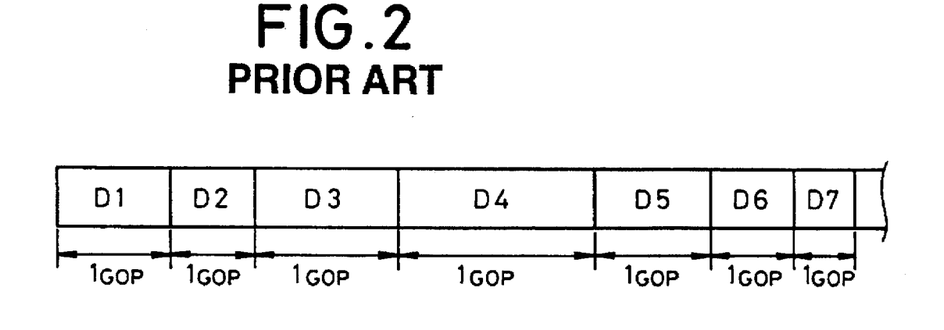
FIG. 2 is a diagram showing a recording image on the recording disk when a compressed video signal without dummy data added thereon is recorded.

If the GOP blocks 1 through 7 having different data mounts per one GOP are consecutively recorded on a recording disk, the recording image will assume the pattern as shown in FIG. 2. Hence, if the read-out of the information recorded on the recording medium is performed with the linear velocity of reading operation constant, then the time period for the read-out of a GOP block of a larger data quantity would become longer than the time period for the read-out of a GOP block of a smaller data quantity. In the MPEG described above, however, the time period assigned for the image reproduction processing of one GOP block is constant (for example, 0.5 second) without regard to the data quantity.

Therefore, with conventional recording disks, the recording operation is performed wherein dummy data is added to each of the compressed video signal portions generated by the compressing and coding procedures, so that the data quantity per GOP maintained constant.

However, by the addition of the dummy data to each of the compressed video signal portions, there arose a problem that the information recording density of the recording disk is reduced, so that a video signal having a long duration cannot be recorded on a single recording disk.

OBJECTS AND SUMMARY OF THE INVENTION

An object of the present invention is therefore to provide a recording disk which can record a compressed video signal at a high recording efficiency, and also to provide a recorded information reproducing apparatus for reproducing the recorded information from the recording disk of this type.

To achieve the above object of the invention, the recording disk according to the present invention comprises data areas in which a compressed video signal generated by compressing and coding a video signal is recorded in predetermined unit blocks, and at least a data quantity information recording area in which a data quantity signal representing a data quantity of the compressed video signal in each unit block is respectively recorded.

A recorded information reproducing apparatus according to the present invention is adapted to reproduce information from a recording disk which comprises data areas in which a compressed video signal generated by compressing and coding a video signal is recorded in predetermined unit blocks, and at least a data quantity information recording area in which a data quantity signal representing a data quantity of the compressed video signal in each unit block is recorded, and the apparatus comprises: rotation driving means for performing a rotation driving of the disk; a pick-up for reading-out recorded information from the recording disk and producing a read-out signal; signal reproducing means for reproducing the compressed video signal and the data quantity signal based on the read-out signal and respectively producing a reproduced compressed video signal and a reproduced data quantity signal; and a controller for controlling said rotation driving means to drive said disk in a manner that a read-out linear velocity by said pick-up equals a linear velocity corresponding the reproduced data quantity signal.

According to the present invention, the linear velocity of read-out is adjusted in response to the data quantity signal reproduced from the recording disk which comprises data areas in which the compressed video signal in predetermined unit blocks (GOP blocks) produced by compressing and coding procedure is recorded and a data quantity information recording area in which the data quantity signal representing data quantity of each compressed video signal block is recorded.

DETAILED DESCRIPTION OF PREFERRED EMBODIMENTS

The embodiments of the present invention will be described hereinafter with reference to the accompanying drawings.

Figure 3:
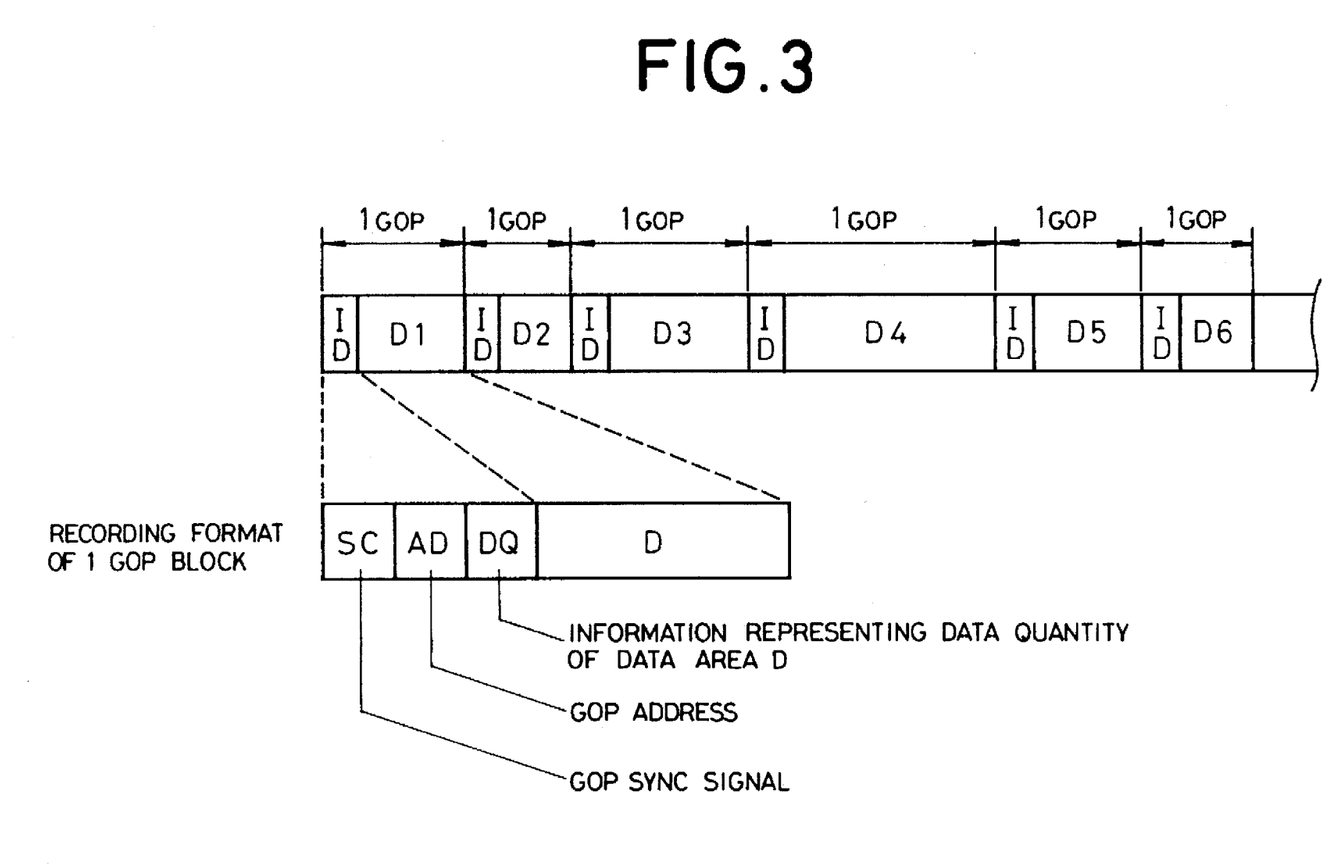
FIG. 3 is a diagram showing an example of the recording format of the recording disk according to the present invention.

FIG. 3 is a diagram showing an example of the recording format of the recording disk according to the present invention.

In FIG. 3, one GOP is constituted by an identification area ID provided at a head position thereof, and a data area D. In such a data area D, there recorded is a compressed video signal produced, for example, by compressing and coding a video signal according to MPEG system which conforms to ISO 11172. It is assumed that dummy data is not added to the compressed video signal.

The identification area ID is constituted by a GOP sync signal recording area SC in which a GOP synchronizing signal representing the position at which the GOP block exists is recorded, a GOP address recording area AD which an address signal representing the address of the GOP block is recorded, and a data quantity information recording area DQ in which data quantity signal representing the data quantity of the compressed video signal recorded in the data area D in one GOP block.

In the embodiment described above, data quantity information recording area DQ is provided in the identification area ID in each GOP block. The position of the area DQ is, however, not limited to that shown in the above example.

Figure 4:
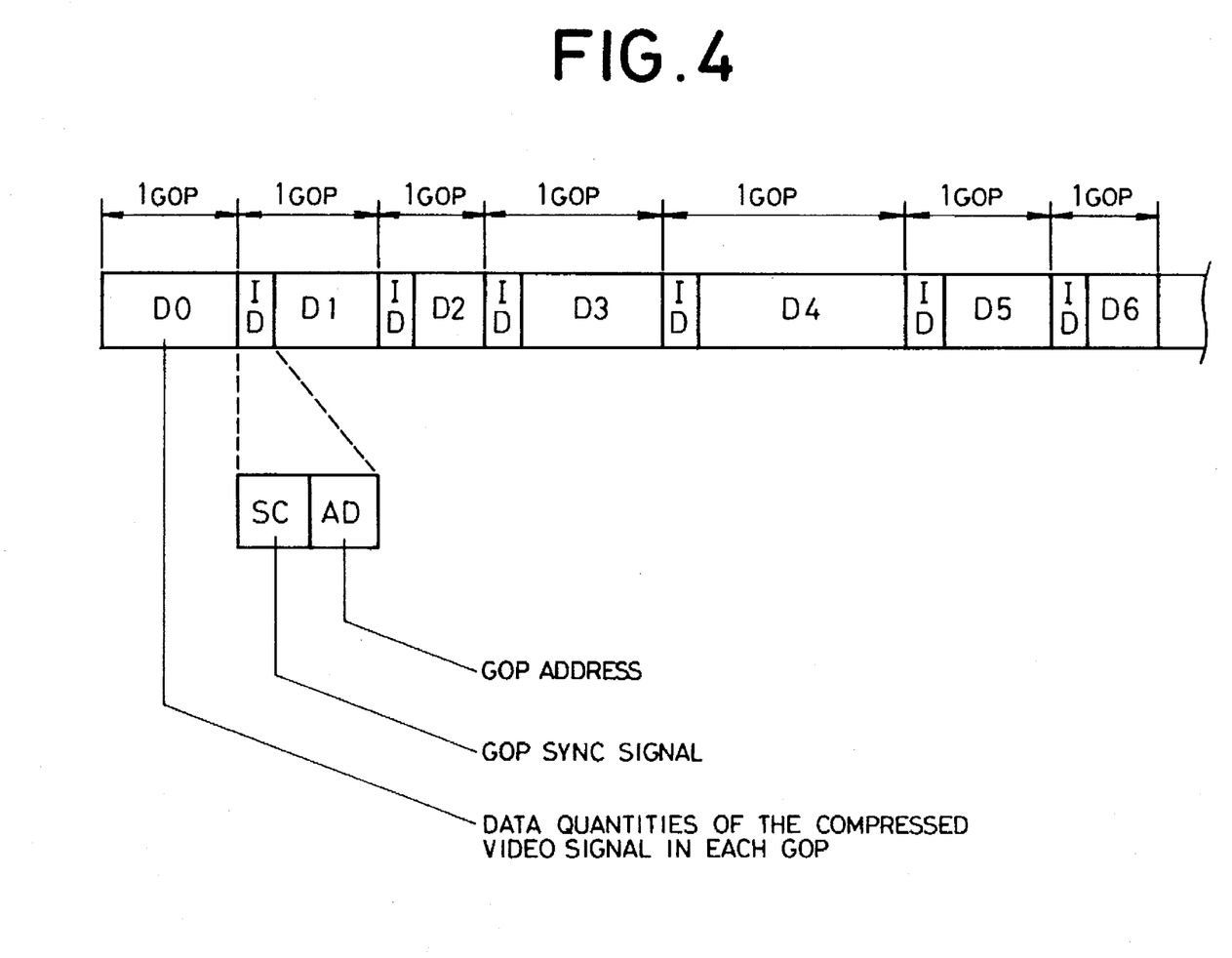
FIG. 4 is a diagram showing a recording format of the recording disk as another embodiment of the present invention.

FIG. 4 shows a recording format in another embodiment of the recording disk according to the present invention;

As shown in FIG. 4, one data quantity information recording area DQ may be provided for a group constituted by a plurality of GOP blocks, and the data quantity formation recording area DQ may be formed at a head position of the group. In essence, it is sufficient that an area for recording information representing data quantity of each compressed video signal is formed at a head position of the compressed video signal.

In addition, the maximum and minimum pit lengths of the pits recorded on the disk in the format shown in FIGS. 3 and 4 are the same for every GOP block.

The recorded information reproducing apparatus according to the present invention which performs reproduction of the recorded information from the recording disk having the above described recording format will now be explained.

Figure 5:
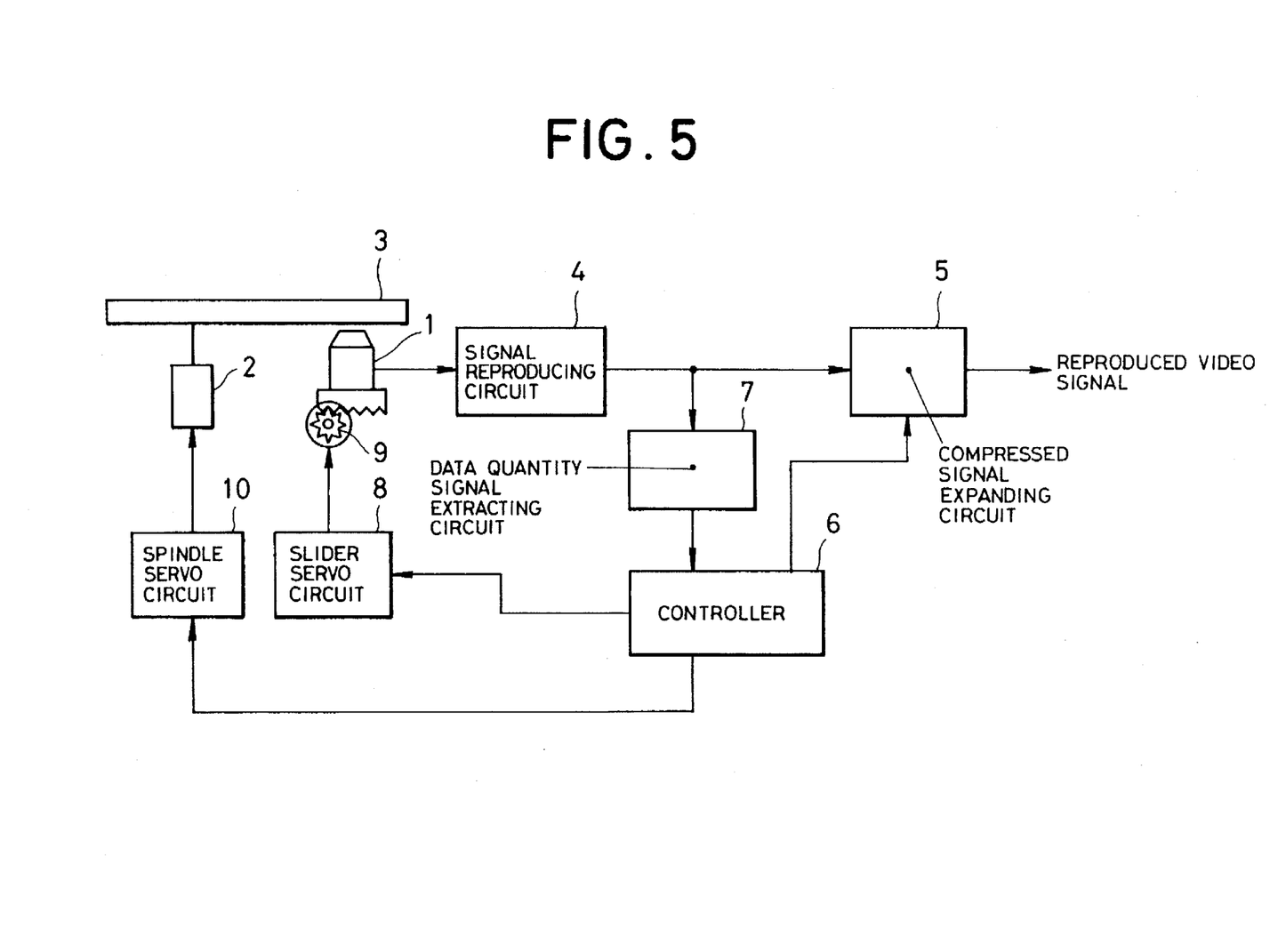
FIG. 5 is a diagram showing the structure of a recorded information reproducing apparatus according to the present invention.

FIG. 5 shows a structure of the recorded information reproducing apparatus.

In FIG. 5, a pick-up 1 reads-out recorded information from a recording disk 3 rotated by a spindle motor 2, and supplies a read-out signal to a signal reproducing circuit 4. It is assumed that in the recording disk 3, a GOP sync signal, an address signal representing the addresses of GOP blocks, a data quantity signal representing the quantity of the compressed video signal, and a compressed video signal are recorded in the format shown in FIGS. 3 and 4.

The signal reproducing circuit 4 reproduces the information signals described above, to produce a reproduced GOP sync signal, a reproduced address signal, a reproduced data quantity signal, and a reproduced compressed video signal. The compressed signal expanding circuit 5 then performs an expansion decoding process for the reproduced compressed video signal in accordance with an expansion algorithm according to the MPEG scheme and an expansion control signal supplied from the controller 6.

The data quantity signal extracting circuit 7 extracts, among the various information signals reproduced by the signal reproducing circuit 4, only the data quantity signal and supplies it to the controller 6. Since the data quantity signal is recorded absolutely in the data quantity information recording area DQ shown in FIGS. 3 and 4, it is sufficient for the data quantity signal extracting circuit 7 to detect the position of the data quantity information recording area DQ, and to determine the reproduced signal obtained upon the above detection as the reproduced data quantity signal.

The controller 6 supplies a pick-up move signal to the slider servo circuit 8 in order that the recorded information on the disk 3 is consecutively read-out by the pick-up. The slider servo circuit 8 then supplies a move signal having a level responsive to the pick-up move signal to the slider device 9, which in turn moves the pick-up 1 in the radial direction of the disk 3 by an amount corresponding to the level of the pick-up move signal.

The controller 6 further supplies a rotational speed control signal to the spindle servo circuit 10 so that the linear velocity of reading by the pick-up 1 relative to the recording disk 3 assumes a linear velocity corresponding to the reproduction data quantity signal supplied from the data quantity signal extracting circuit 7. The spindle servo circuit then supplies a rotational speed signal having a level corresponding to the rotational speed control signal to the spindle motor 2. The spindle motor 2 then rotates the recording disk 3 at a rotational speed corresponding to the rotational speed signal.

The operation of the apparatus having the structure described in the foregoing will be described hereinafter.

The controller 6 at first supplies, to the spindle servo circuit 10, a rotational speed control signal to set the linear velocity of reading at the pick-up 1 relative to the recording disk 3 at a predetermined initial linear velocity. For this initial linear velocity, an average linear velocity which is previously estimated according to the design of the apparatus is used. In response to this control operation, the spindle motor 2 rotates the recording disk 3 at a rotational speed whereat the linear velocity of the reading by the pick-up 1 equals the initial linear velocity. The read signal read-out from the recording disk 3 by the pick-up 1 under this condition is supplied to the signal reproducing circuit 4.

The data quantity signal extracting circuit 7 extracts, among the various information signal reproduced at the signal reproducing circuit 4, the reproduced data quantity signal and supplies it to the controller 6. Then, the controller 6 supplies, to the spindle servo circuit 10, a rotational speed control signal to set the linear velocity of the reading at the pick-up 1 relative to the recording disk 3 equals to a linear velocity which corresponds to the reproduced data quantity signal. In response to this control operation, the spindle motor 2 drives the recording disk 3 to rotate at a rotational speed whereat the linear velocity of the reading of information by the pick-up 1 equals the linear velocity which corresponds to the reproduced data quantity signal.

Figure 6:
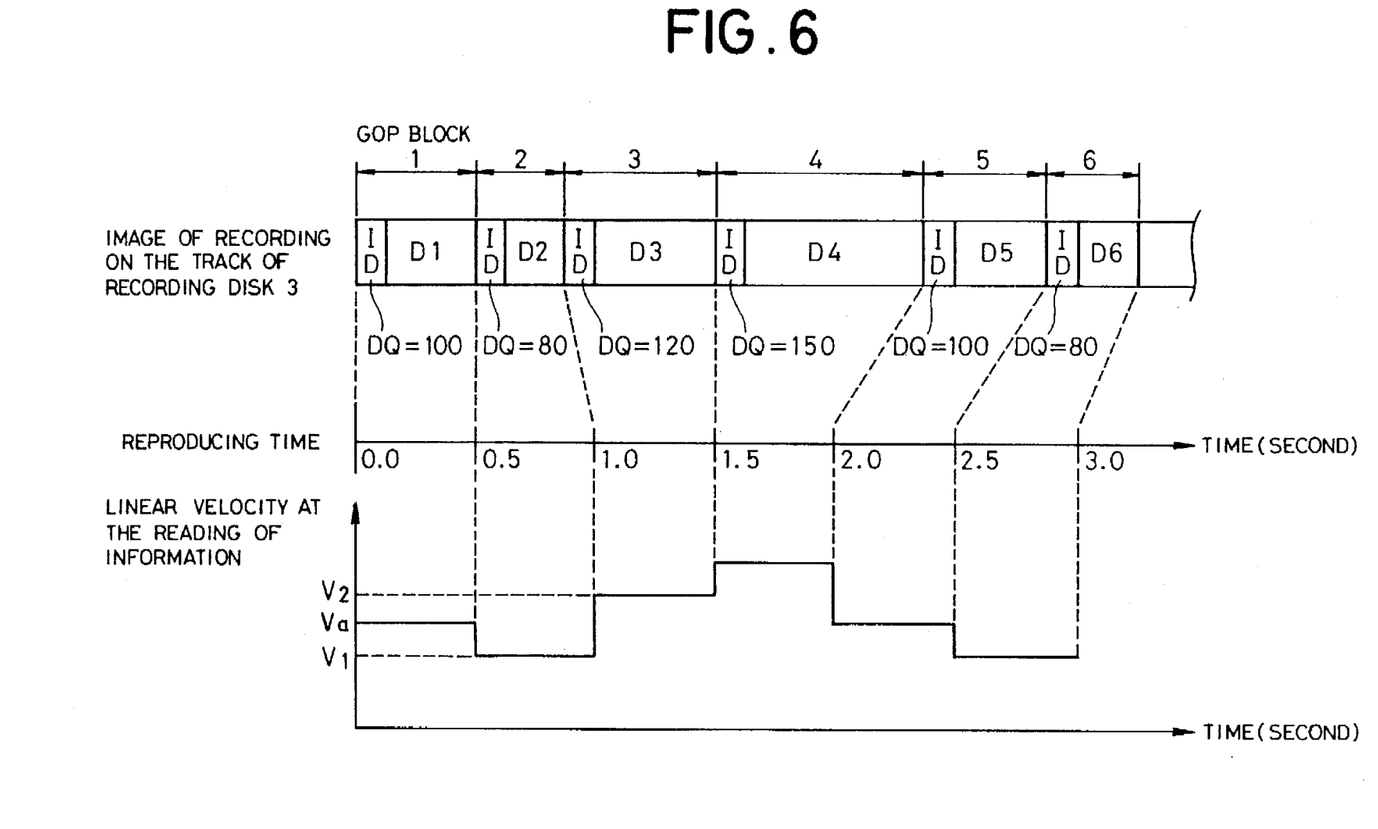
FIG. 6 is a diagram showing the operation of the recorded information reproducing apparatus according to the present invention.

FIG. 6 shows an example of operation performed when the recording information is reproduced from the recording disk on which the recording of information is performed with the recording format shown in FIG. 3, by the recorded information reproducing apparatus configured in the manner described above.

At first, the spindle motor 2 drives the recording disk 3 at a rotational speed whereat the linear velocity of the reading of information by the pick-up 1 equals the average linear velocity Va. In this state, the data quantity signal extracting circuit 7 extracts a value "100" as the data quantity signal recorded in the data quantity information recording area of the GOP block 1. The spindle motor 2 drives the recording disk 3 to rotate at a rotational speed whereat the linear velocity of the reading of information by the pick-up 1 equals to a linear velocity corresponding the data quantity signal "100". Since the linear velocity corresponding to the data quantity signal "100" is identical to the average linear velocity Va, the recording disk 3 is continuously rotated to maintain the average linear velocity Va. Therefore, the pick-up reads-out the compressed video signal D1 recorded in the data area D of the GOP block 1 at the average linear velocity Va. When the reading and reproduction is performed for the GOP block 1 which contains the compressed video signal D1 having the data quantity corresponding to the data quantity signal "100", the time period required for the reproduction processing will become 0.5 second.

When the reading and reproduction for the GOP block 1 is completed, then the data quantity signal extracting circuit 7 extracts a value "80" as the data quantity signal recorded in the data quantity information recording area DQ of the GOP block 2. Then the spindle motor 2 drives the recording disk 3 to rotate at a rotational speed whereat the linear velocity of the reading of information by the pick-up 1 equals a linear velocity V1 corresponding to the data quantity signal "80". Since the quantity of the compressed video signal D2 in the GOP block 2 is 20% smaller than that of the compressed video signal D1 whose data mount signal is "100", the spindle motor 2 drives the recording disk 3 so that the linear velocity V1 which is 20% slower than the linear velocity of reading Va for the GOP block 1 is assumed. Therefore, the pick-up 1 reads the compressed video signal D2 recorded in the data area D of the GOP block 2 with the linear velocity V1. Although the data quantity of the compressed video signal D2 recorded in the data area D of the GOP block 2 is lower than that of the compressed video signal D1, the linear velocity for reading is reduced accordingly, so that the time period required for reading and reproduction processing for the GOP block 2 will become also 0.5 second as with the GOP block 1.

When the reading and reproduction for the GOP block 2 is completed, then the data quantity signal extracting circuit 7 extracts a value "120" as the data quantity signal recorded in the data quantity information recording area DQ of the GOP block 3. The spindle motor 2 then drives the recording disk 3 to rotate at a rotational speed whereat the linear velocity for reading of information by the pick-up 1 equals a linear velocity V2 corresponding the data quantity signal "120". Since the data quantity of the compressed video signal D3 in the GOP block 3 is 20% larger than that of the compressed video signal D1 having the data quantity signal "100", the spindle motor 2 drives the recording disk 3 so that the linear velocity V2 which is 20% lower than the linear velocity of reading Va for the GOP block 1 is assumed. Therefore, the pick-up 1 reads-out the compressed video signal D3 recorded in the data area D of the GOP block 3 with the linear velocity V2. In this process, although the data quantity of the compressed video signal recorded in the GOP block 3 is larger than that of the compressed video signal D1, the linear velocity of reading is raised accordingly. Therefore, the time period required for the reading and reproduction processing for the GOP block 3 becomes 0.5 second as with the GOP block 1. As specifically described in the foregoing, in the recorded information reproducing apparatus according to the present invention, each time the data quantity signal recorded in the data quantity information recording area DQ is read-out from the disk 3 and reproduced, the rotational speed of the recording disk 3 is controlled so that a linear velocity of reading corresponding to the reproduced data quantity signal is attained. Thus, the time period required for the reproduction processing of the compressed video signal in one GOP block is maintained constant regardless of the data quantity of the compressed video signal in the GOP block.

In the embodiment described above, information representing the data quantity of each compressed video signal is recorded on the recording disk and the data quantity information is then read-out for the adjustment of the linear velocity for reading in the recorded information reproduction apparatus. However, it is also possible to perform an adjustment of the linear velocity for reading that is similar to the above embodiment without recording the data quantity information on the recording disk.

Figure 7:
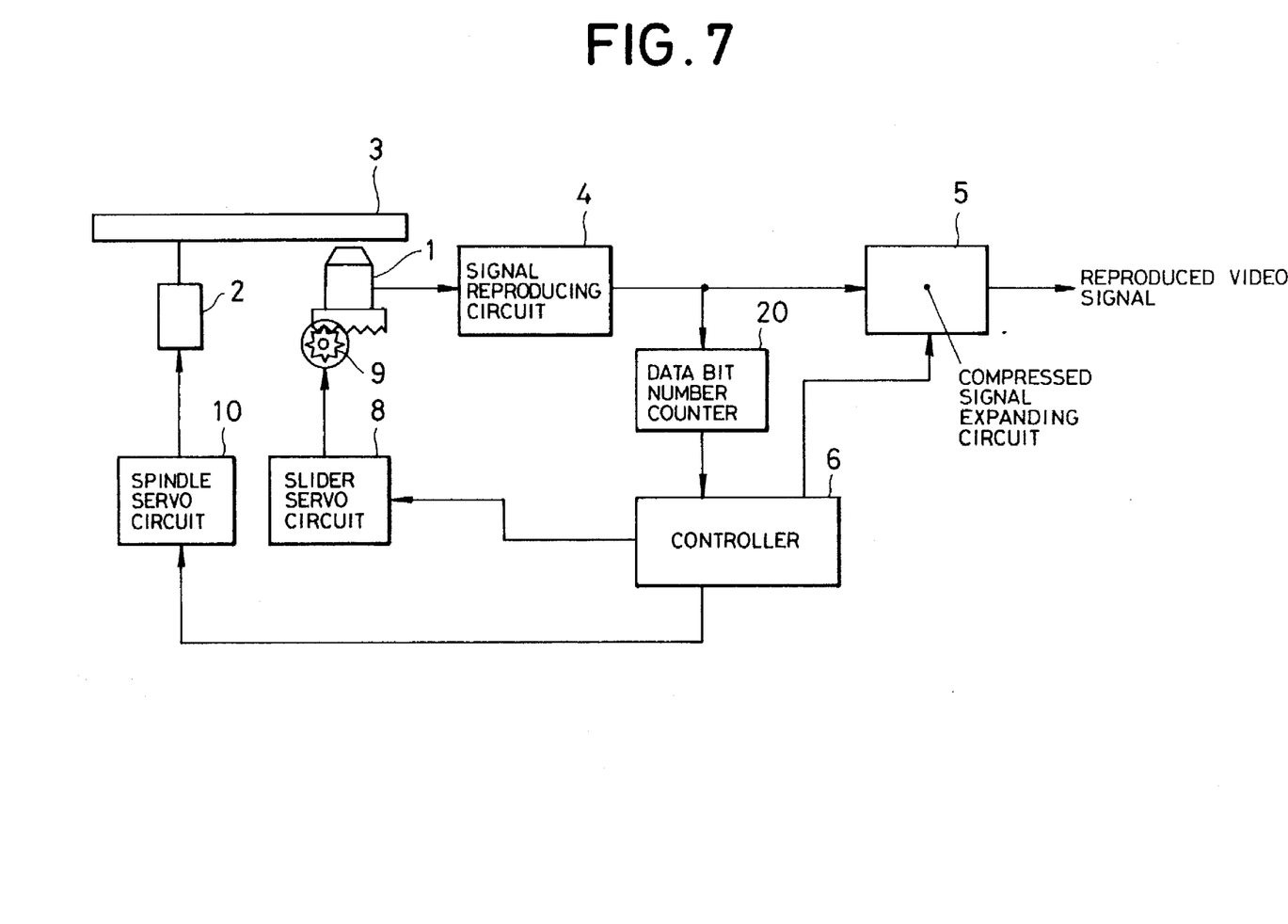
FIG. 7 is a diagram showing the structure of a recorded information reproducing apparatus as another embodiment of the present invention.

FIG. 7 is a diagram showing the structure of a recorded information reproducing apparatus as an embodiment of the present invention configured in view of the above-mentioned point.

In FIG. 7, the pick-up 1 reads-out the recorded information from the recording disk 3 which is rotated by the spindle motor 2 and supplies the read-out signal to the signal reproducing circuit 4. It is assumed that the compressed video signal for each GOP is consecutively recorded on the recording disk 3 with the recording shown in FIG. 2.

The signal reproducing circuit 4 reproduces the compressed video signal based on the read-out signal described above, to produce a reproduced compressed video signal. The compressed signal expanding circuit 5 in turn performs an expanding and decoding process to the reproduced compressed video signal based on the expansion algorithm which conforms to the MPEG scheme and an expansion control signal supplied from the controller 6, to produce a reproduced video signal.

The data bit number counter 20 counts up the number of data bits of the compressed video signal reproduced by the signal reproducing circuit 4 for each GOP, and supplies the number of data bits in each one GOP, to the controller 6, as a data quantity signal. In other words, the data bit number counter 20 measures the quantity of data of the compressed video signal by counting up the data bit number of the reproduced compressed video signal for each GOP.

The controller 6 supplies the rotational speed control signal to the spindle servo circuit 10 thereby the linear velocity of the reading of information by the pick-up 1 relative to the recording disk 3 equals a linear velocity corresponding to the data quantity signal supplied from the data bit number counter 20 described above. Then, the spindle servo circuit 10 supplies to the spindle motor 2 a rotational speed signal having a level corresponding to the rotational speed control signal. The spindle motor 2 in turn drives the recording disk 3 to rotate at a rotational speed corresponding to this rotational speed signal.

In the recorded information reproducing apparatus as shown in FIG. 7, the data quantity of each one GOP block is measured by counting up the data bit number of the reproduced compressed video signal for each one GOP. With this feature, the adjustment of the reading linear velocity which is similar to that of the apparatus shown in FIG. 5 can be performed without recording the information representing the data quantity of each compressed video signal on the recording disk.

As specifically described in the foregoing, the recording disk according to the present invention comprises data areas for recording a compressed video signal produced by the compression and coding process in predetermined unit blocks (GOP blocks), and at least a data quantity information recording area for recording a data quantity signal representing the data quantity of each unit of the compressed video signal.

In the recorded information reproducing apparatus according to the present invention, the linear velocity of the reading is adjusted in response to the data quantity signal reproduced from the recording disk having a configuration described above.

Hence, in the recorded information reproducing apparatus according to the present invention, the time period required for the reproduction processing of the video signal of the predetermined unit block can be maintained constant without response to the data quantity of each unit block of the compressed video signal recorded on the recording disk.

As will be appreciated from the description in the foregoing, according to the present invention the recording rate per predetermined unit block on the recording disk need not be maintained, so that the addition of dummy data to the compressed video signal produced by the compression and coding process. This realizes a significant improvement in the efficiency of recording.

What is claimed is:

1. A recorded information reproducing apparatus for reproducing information from a recording disk which comprises data areas in which a compressed video signal generated by compressing and coding a video signal is recorded in predetermined unit blocks, and at least a data quantity information recording areas in which a data quantity signal representing a data quantity of the compressed video signal in each unit block is recorded, said apparatus comprising:

rotation driving means for performing a rotation driving of the disk;

a pick-up for reading-out recorded information from the recording disk and producing a read-out signal;

signal reproducing means for reproducing the compressed video signal and the data quantity signal based on said read-out signal and respectively producing a reproduced compressed video signal and a reproduced data quantity signal; and a controller for controlling said rotation driving means to drive said disk in a manner that a read-out linear velocity by said pick-up equals a linear velocity corresponding to the reproduced data quantity signal.

2. A recorded information reproducing apparatus recited as claimed in claim 1, wherein said controller performs a control of driving of said rotation driving means in a manner that the linear velocity of the reading by said pick-up is raised as the data quantity of said compressed video signal represented by said reproduced data quantity signal increases.

3. A recorded information reproducing apparatus for reproducing information from a recording disk which comprises data areas in which a compressed video signal generated by compressing and coding a video signal is recorded in predetermined unit blocks, said apparatus comprising:

rotation driving means for performing a rotation driving of the disk;

a pick-up for reading-out recorded information from the recording disk and producing a read-out signal;

signal reproducing means for reproducing the compressed video signal based on said read-out signal and respectively producing a reproduced compressed video signal;

compressed signal expanding means for expanding said reproduced compressed video signal and producing said video signal;

data quantity measuring means for counting up the number of data bits of said reproduced compressed Video signal for each of said predetermined unit blocks and producing a count value as a data quantity signal; and a controller for controlling said rotation driving means to drive said disk in a manner that a read-out linear velocity by said pick-up equals a linear velocity corresponding to said data quantity signal.

* * * * *